United States Patent [19]

Lubarsky et al.

[11] Patent Number: 4,841,437
[45] Date of Patent: Jun. 20, 1989

[54] SYSTEM ARCHITECTURE FOR A TEST APPARATUS HAVING PRIMARY AND DEPENDENT PROCESSORS

[75] Inventors: Andre Lubarsky, Sunnyvale; Richard E. Pospisil, Cupertino, both of Calif.

[73] Assignee: LP COM, Mountain View, Calif.

[21] Appl. No.: 777,173

[22] Filed: Sep. 18, 1985

[51] Int. Cl.⁴ .................................... G06F 13/40
[52] U.S. Cl. .............................. 364/200; 371/22
[58] Field of Search ............... 371/22; 364/200, 900, 364/748

[56] References Cited

U.S. PATENT DOCUMENTS

| Re. 30,037 | 6/1979 | Bass | 371/22 |
|---|---|---|---|
| 4,066,883 | 1/1978 | Wheeler, Jr. | 371/22 |
| 4,283,773 | 8/1981 | Daughton et al. | 364/900 |
| 4,386,413 | 5/1983 | Vignes et al. | 364/748 |
| 4,388,697 | 6/1983 | Breen et al. | 364/900 |
| 4,390,964 | 6/1983 | Horky et al. | 364/900 |
| 4,405,951 | 9/1983 | Omori et al. | 364/900 |
| 4,417,336 | 11/1983 | Weilbacker | 364/900 X |
| 4,419,756 | 12/1983 | Cheng-Quispe | 364/900 X |
| 4,434,460 | 2/1984 | Drakenborn | 364/900 X |
| 4,459,655 | 7/1984 | Willemin | 364/200 X |
| 4,516,199 | 5/1985 | Frieder et al. | 364/200 |
| 4,628,511 | 12/1986 | Stitzlein et al. | 371/22 |
| 4,675,803 | 6/1987 | Kendall et al. | 364/200 X |
| 4,703,433 | 8/1987 | Sharrit | 364/485 |

OTHER PUBLICATIONS

*IBM Tech. Discl. Bull.*, vol. 21, No. 7, Dec. 1978, "Dynamic Hardware Sampling of On-Line Processing", by P. A. Cardenia et al., pp. 2765-2767.

Primary Examiner—Raulfe B. Zache
Assistant Examiner—Florin Munteanu
Attorney, Agent, or Firm—Limbach, Limbach & Sutton

[57] ABSTRACT

A multifunction test apparatus which is capable of performing total communication network measurments and includes a primary processor linked to a number of dependent processors. The primary processor plays a number of different roles in the functioning of the test system, which roles require substantial interaction between the primary processor and dependent processors. In some test configurations, the primary processor becomes a dependent processor. In other configurations, the primary processor is timeplexed and interleaved with the operation of the dependent processors in performing subfunctions for the dependent processors. The architecture also provides for direct communication and resource sharing between the dependent processors. In another aspect of the subject invention, the primary processor performs overflow calculations for the dependent processors. Finally, the device is arranged such that all test functions are displayed with consistent screen formats.

3 Claims, 5 Drawing Sheets

SYSTEM ARCHITECTURE FOR A TEST APPARATUS HAVING PRIMARY AND DEPENDENT PROCESSORS

TECHNICAL FIELD

The subject invention relates to a multi-function test apparatus particularly adapted for use with communication systems. The apparatus is designed to process both analog and digital signals.

BACKGROUND OF THE INVENTION

Today, the test and measurement of telecommunications networks plays a vital role in achieving the high level of system availability required by the end user. Particularly in the field of data communications, companies need a system with little or no down time. In order to achieve a high level of system availability, it is necessary to isolate the network problem and repair or replace the faulty components in minimal time. This requires evaluating the entire network with sufficient test capability to isolate the problem quickly.

The configuration of every network is different and, therefore, isolating the problem the first time can prove difficult. With a variety of transmission technologies, from digital to analog and a wide range of frequencies, plus the many types of links that are utilized, such as voicegrade circuits and carrier facilities within the network, an extensive repertoire of test functions is required.

Today, total network testing can be broken down into four basic areas: protocol testing, digital transmission testing, signaling/supervision, and analog transmission testing. Protocol testing is applicable over the entire telecommunications network. Digital transmission testing and signaling/supervision activities cover the complete network with the exception of the terminal equipment and modem interfaces. Analog transmission testing is specific to carrier facility links.

In the prior art, evaluation of these four areas required separate pieces of test and measurement equipment, each utilizing at least one essential instrumentation package. For example, transmission impairment measuring sets (TIMS) provide analog test capabilities such as measurement of level/frequency, signal-to-noise, envelope delay, intermodulation distortion, phase and amplitude jitter, P/AR, and return loss.

Signaling/supervision test sets provide the supervisory and address signaling functions needed to access and control different types of transmission circuits. Protocol analyzers perform monitoring, recording, trapping, emulating, and analyzing functions at the physical data link and network protocol levels.

Digital transmission, or pulse code modulation (PCM), test sets provide for dropping and inserting signals from and into the PCM pulse train, measurement of bipolar violations, frame synchronization, and signaling bit status. Frequency selective level meters enable numerous routine tests to be performed over a wide range of frequencies, from voiceband up through "group" frequencies.

All of this test and measurement equipment is essential in the process of testing and isolating problems within the complete network.

For maintenance or service personnel, testing a network is a big job. When faced with a faulty network and the pressures to get back on-line, they have two choices. They can attempt to deduce where the problem lies from information given by the end user and risk taking only one or two pieces of test equipment along with them. On the other hand, if they have little or no information about the problem, they must take as much equipment as they can carry.

The job would be significantly easier if each piece of test equipment could perform several test functions. It would be better still if all the functions required to test a complete telecommunications network could be incorporated into one unit. A single package is easier to carry and lighter than several instruments. A single instrument will also be less costly if it performs multiple tests yet only has a single housing, single power supply and single display.

Technology is at a stage where total network testing with a single package is possible by imaginatively exploiting the computing power of a microcomputer or processor. By adding multiple test function capabilities to a basic computer package, it is possible for a single unit to provide all the functions necessary to test a complete telecommunications network and to provide computer power as well.

Many features of the computer are highly complementary to the field of network testing. A computer driven device can have an integrated screen or display, a feature which has been offered in individual test sets presently available. In the subject system, where many tests are combined in a single package, the computer makes it possible to arrange the screen formats to be relatively consistent for each test. In this way, a single technician can be rapidly taught to perform a variety of measurements. Computer-based instrumentation also allows entry level technicians to perform complex test functions. Parameters, limits, and conditions of a sequence of tests can be programmed ahead of time by a senior technician. All the trainee needs to do is hook up the instrument to the line and, in the simplest configuration, press a single key to start the test sequence.

Another advantage of a computer-based instrument is that by utilizing self-diagnostics, the device can take care of its own maintenance in a fraction of the time it would take a service technician. Many selfdiagnostics programs take only seconds to run and can be activated each time the instrument is turned on.

A computer-based instrument is also advantageous in that administrative processes of a service organization can be controlled. Rather than having service personnel fill out lengthy reports detailing trouble and solutions, with the help of administrative software, the test results can be stored in the device and transferred to a central office electronically.

Many of today's test devices incorporate one or more microprocessors, but often only to replace existing discrete digital components. While this results in the simplifying of manufacture, and the reduction of cost to the buyer, the operation and function of these test devices do not differ substantially from that of their predecessors. These systems in most part fail to exploit the computing power of the microcomputer.

In contrast, in the subject invention, a true use of the computing power of microcomputers and microprocessors is made, to the point where the operating capabilities of the processors used are pushed to their limit. The subject invention employs a unique system architecture to provide each of the four basic areas required for total network testing in a single microcomputer based unit. In such architecture the processors take on many roles and preform a variety of functions. Because the computer architecture, changes, modifications and corrections in the testing functions can be easily and simply implemented by way of a software change, e.g. such as by changing the program on a floppy diskette. Further, test functions can be added easily and simply by modifying the programs on a diskette or adding additional programming by way of diskette.

Accordingly, it is an object of the subject invention to provide a new and improved piece of test equipment which can perform multiple types of telecommunication network measurements.

It is a further object of the subject invention to provide a multiple test device wherein the display function associated with each test is arranged with a consistent format to facilitate operation.

It is another object of the subject invention to provide a new and improved multiple test device having a novel architecture.

It is still a further object of the subject invention to provide a new and improved multiple test device wherein processing functions are shared among various microprocessors to increase computing speed.

SUMMARY OF THE INVENTION

In accordance with these and many other objects, the subject invention provides an apparatus specifically adapted for use with communications systems. The device is intended to perform test functions in a communication network in all of the four areas outlined above.

In order to achieve these results, a unique architecture has been developed to permit multiple functions to be carried out at high speed in a single housing. This architecture includes a primary processor having a primary digital information bus. A number of dependent processors are provided each of which is primarily responsible for various aspects of network testing. Each of the dependent processors are connected to the primary processor along the digital information bus.

In the prior art, it was known to connect a number of individual test devices to a master controller. This approach allowed only very limited cooperation between the test devices and the controller and did not permit any cooperation or communication between the various independent test devices. In contrast, in the subject invention, a novel system architecture is provided which enhances the cooperation between the dependent processors and the primary processor, and even allows for cooperation between the dependent processors themselves. For example, in operation, the primary processor can be utilized to perform overflow calculations thereby increasing the speed of the dependent processor. In addition, information can be transferred directly between the dependent processors to enhance operations.

Another advantage of the subject invention is the ability of the primary processor to display all test functions in a consistent format. In this manner, a entry level technician, who has learned one test function, can rapidly learn other test functions performed by the device.

Further objects and advantages of the subject invention will become apparent from the following detailed description taken in conjunction with the drawings in which:

DETAILED DESCRIPTION OF THE PREFERRED EMBODIMENT

Figure 1:
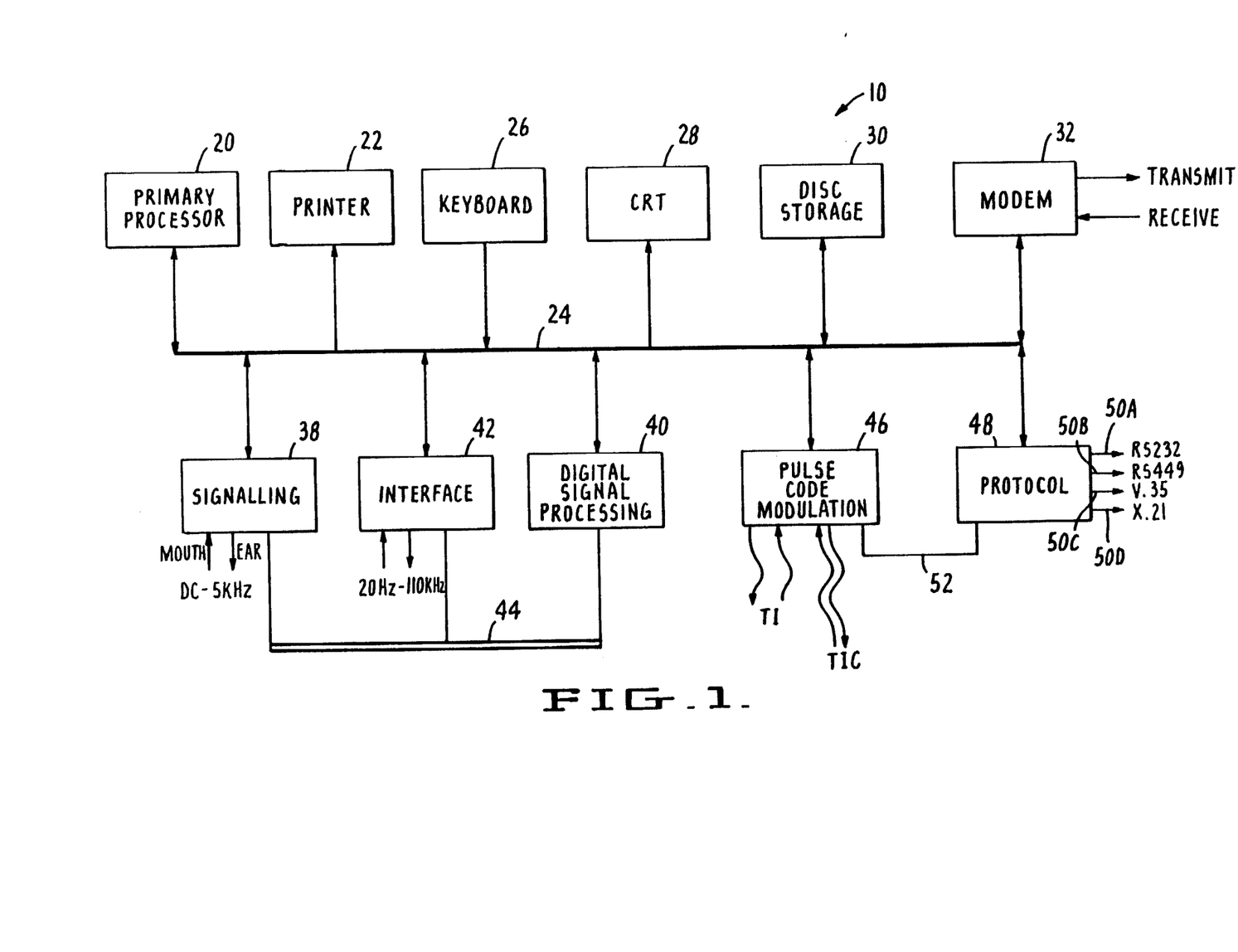
FIG. 1 is a block diagram illustrating the components of the apparatus of the subject invention.

Referring to FIG. 1, there is illustrated a block diagram of the apparatus 10 of the subject invention. It is intended that the apparatus 10 comprise a single device having a common housing, power supply and screen. A unique architecture is provided to permit shared communication and processing between a primary processor 20 and a plurality of dependent processors, as described below.

Prior to discussing the unique aspects of the system architecture, the more basic conventional components will be outlined. As illustrated in FIG. 10, the system is driven by a primary processor 20. In the embodiment shown the system is implemented with an IBM-PC compatible computer. It is to be understood that any general purpose computer can be used within the spirit of the subject invention. The primary processor 20 can be used to support various administrative functions such as storing the results of test measurements, and communicating these results to a central source. The primary processor 20 can also be used to store multiple test sequences to simplify operation in the field.

The primary processor 20 includes a main digital information bus 24. In the preferred embodiment, this digital information bus is a standard MS-DOS bus. A number of peripherals are connected to this bus in a standard manner. These peripherals can include a printer 22, keyboard 26, a CRT 28, disc storage 30 and modem 32.

In accordance with the subject invention, a plurality of dependent processors are also provided connected to the digital information bus 24. In general, each of these modules is primarily responsible for performing one of the four test areas outlined above. However, it is an unique advantage of the system architecture that the dependent processors cooperate in an interactive manner both with the primary processor 20 and, at times, with each other to produce unexpected and highly desirable performance characteristics.

Each of the dependent processors and their principal functions will now be described. Their operation and cooperation in the subject invention will be outlined in conjunction with the flow diagrams that illustrate examples of some test sequences.

In accordance with the subject invention, the primary processor can assume many roles, among these being that of a dependent processor. In the case of the signalling function, the primary processor "becomes one" or "merges" with the operation of the signalling module 38 to perform supervisory and address signalling functions needed to access and control different types of transmission circuits. The signalling function is typically associated with controlling and supervising telephone lines. Thus, in the subject invention, the dependent processor which provides the signalling function comprises the primary processor, acting as a dependent processor, and operationally merged with the signalling module 38.

A digital signal processing module 40 defines another dependent processor. Module 40 provides for analog test capabilities, such as, level frequency, signal-to-noise, envelope delay, intermodulation distortion, phase and amplitude jitter, return loss and noise. The digital signal processing module performs these analog measurement functions by digitizing the signal and utilizing fast signal analysis techniques to obtain the result. Additional information about a digital signal processing module suitable for use with this device can be found in U.S. patent application, entitled Digital Signal Processing Apparatus for Analog Signals Having Wide Frequency and Dynamic Ranges, Serial No. 777,092, filed even date herewith, assigned to the same assignee as the subject invention and incorporated herein by reference.

Communication to the outside world in the analog regime is facilitated through the provision of an interface module 42. Interface module 42 is connected to the digital information bus 24 and includes a number of latches and relays utilized to route the input/output signals generated or received during test measurement phase of operation.

As illustrated in FIG. 1, the signalling 38, interface 42 and digital signal processing 40 modules are all interconnected along an analog information bus 44. In this manner the resources of the modules interconnected by the analog information bus 44 can be shared among the modules. One test sequence which illustrates this sharing of resources between the modules, independent of communication with the primary processor, is set forth in the flow diagram of FIG. 2, discussed below.

The subject invention also includes another dependent processor module 46 designed to interface with digital transmissions. The pulse code modulation module 46 is specifically arranged for dropping and inserting signals from and into a PCM pulse train. The module also is capable of performing measurement of bipolar violations, frame synchronization and signalling bit status.

A protocol module 48 is also provided and is connected to the digital information bus 24. The protocol module is designed to perform monitoring, recording, trapping, emulating and analyzing functions. In a preferred embodiment, the protocol module includes a number of standard interface ports. These interface ports are listed as 50A through 50D and consist of standard physical interfaces. One configuration of such physical interfaces can be those shown in FIG. 1; i.e. RS232, RS449, V.35 and X.21. It is to be understood that different combinations of these physical interfaces, or other different standard physical interfaces can be used within the spirit of the subject invention. In the preferred embodiment, the protocol module consists of a number of boards, each of which are connected to the information bus. A separate interface bus interconnects 52 the multiple boards of the protocol module. Each of the output lines 50 is then, in turn, connected to the interface bus 52. In accordance with the architecture of the subject invention, module 46 is also connected to the protocol module 48 along the same interface bus 52.

It is to be understood that a significant feature of the subject invention is a reliance upon the computing power of the processors within the system to provide and generate the test functions of the system. As discussed earlier, this gives rise to great flexibility in the modification, enhancement, and addition of the test functions of the system. As will be described below, software which implements a selected test function is, in the preferred embodiment of the subject invention, loaded from disk to a selected dependent processor. The dependent processor then executes this software, at times in cooperation with other modules, to provide the test function. It can thus be seen that modification of the software permits a direct and flexible means by which test functions can be changed and added to the system.

Having described the components of the subject invention, a few of the test sequences will now be described in order to illustrate some of the unique advantages of the subject invention.

Figure 2A:
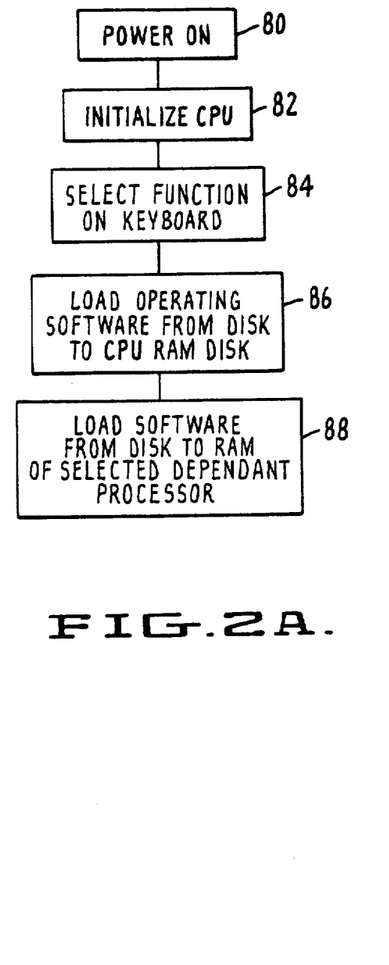
FIGS. 2A and 2B are flow diagram representative of the initialization of the apparatus and one exemplary test function.

FIG. 2A covers the basic start-up routine of the subject apparatus. More specifically, after the power is first turned on at 80, the CPU is initialized at 82. A number of possible test measurements will be displayed on the CRT which can be individually selected from the keyboard at step 84. When the desired function is selected, the software for controlling that function is loaded from the disk storage 30 to the RAM disk of the primary processor 20 at step 86. The selection of a particular routine will also generally require the selection of a dependent processor. Accordingly, the RAM of the dependent processor will be loaded with software from disk 30 in step 88.

One of the advantages of the system architecture is that some dependent processors can communicate directly between each other, thereby permitting resource sharing and ultimately providing to the user a system which is easier to use. For example, direct communication between the PCM module 46 and the protocol module 48 is carried out along interface bus 52. In another example, the signalling, interface and digital signal processing modules can share resources via analog information bus 44.

By way of contrast, previous test systems often comprised a collection of different test equipment boxes, each performing a specific test function. Often, interfaces were required to get the different boxes to talk to one another. The result was an awkward, frustrating, and unwieldy collection of wires and boxes. The architecture of the present invention permits resource sharing and internal interconnection among the various test functions needed to run a test. As such a multiple I/0 capability is provided which eliminates the interfacing struggle so prevalent in previous test set ups.

Figure 2B:
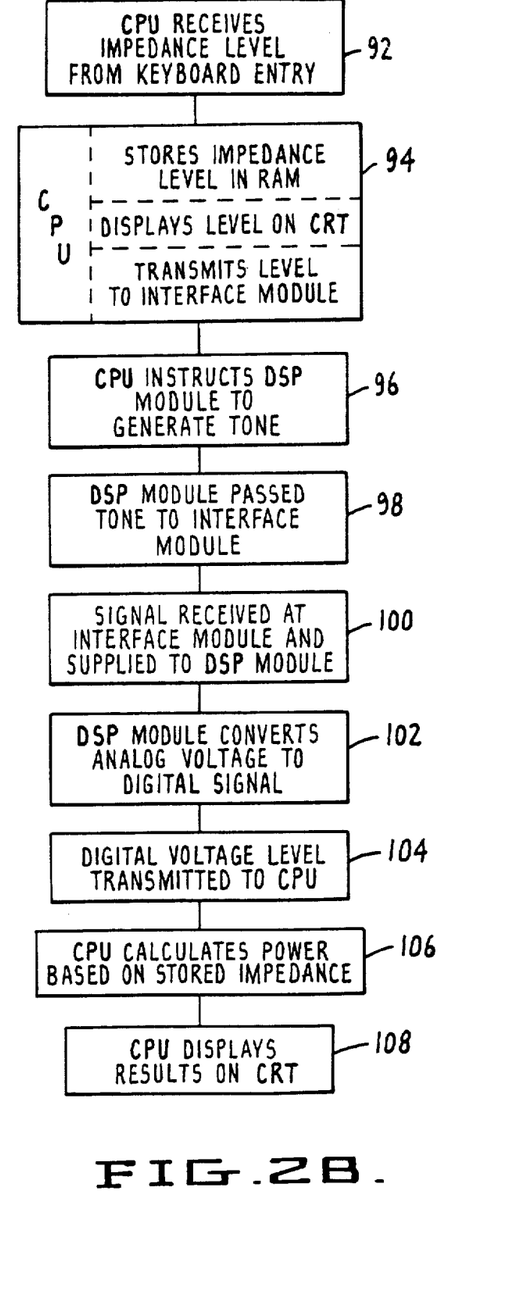

FIG. 2B is intended to illustrate one type of test where a direct link is utilized to provide resource sharing. In this test, the power level and frequency of a tone is measured. This example also demonstrates the versatility of the system since the signal being tested is also generated by module 40.

At the start of the sequence in FIG. 2B, it is assumed that the system has been initialized as set forth in steps 80-88. The operator will first input the impedance at which the line is to be tested. This information is entered on the keyboard and received by the primary processor (CPU) at step 92. The CPU will then store the impedance, display it on the screen and switch the value to the interface module 42 at step 94. The CPU will then command the digital signal processing module 40 to generate the desired analog tone at step 96. Typically, one standard tone is used but this may be altered by the operator. The DSP module 40 connects the digitally generated analog tone to the interface module along analog information bus 64 during step 98.

A signal will be received at an input port of the interface module and supplied to the DSP module during step 100. This voltage is digitized by the DSP module at step 102. The voltage level is supplied to the primary processor 20 at step 104. The primary processor 20 then computes the power level tested on the line based on the impedance stored in memory at step 106. The primary processor then computes the power from the voltage and impedance, expresses it in dBm, and displays it on the CRT screen at step 108.

The example set forth above demonstrated the resource sharing between the dependent processors. In addition, this example illustrates that the architecture of the subject system is arranged to allow the primary processors to assist the dependent processors in overflow calculations. This feature was utilized when the primary processor calculated the power level based on the impedance stored in memory and voltage from the DSP module. The cooperation between the primary and dependent processors is also seen in the test outlined in FIG. 3 where the measurement of non-periodic transients is illustrated.

Figure 3:
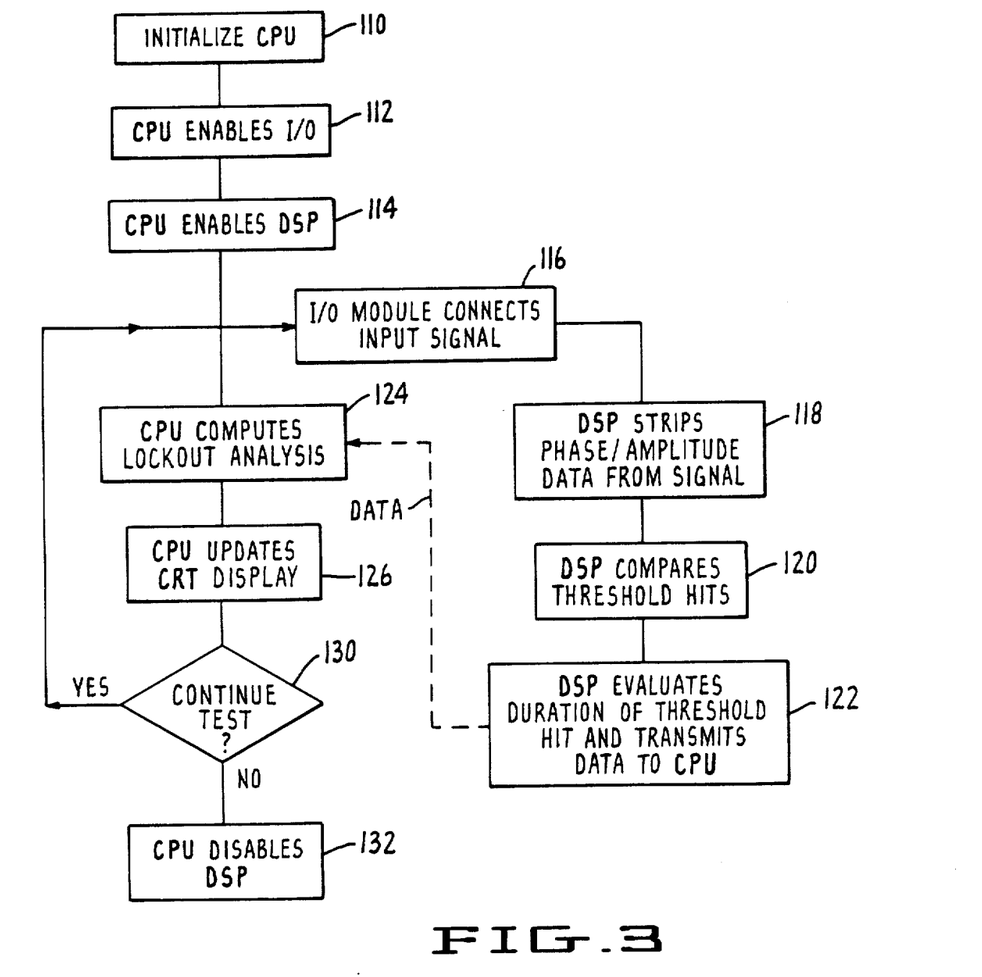
FIG. 3 is a flow diagram illustrating testing for transients in the subject invention.

The measurements which are performed in a standard transient test sequence include gain and phase hits, drop-outs and impulse noise. Recognition of these non-periodic events is dependent upon a specific hierarchy. For example, if a drop out is detected, it should influence the measurement of gain and phase hits, as well as impulse noise. This hierarchy is set by industry standard, an example of which can be found in IEEE Standard, ANSI/743-1984. As will be seen below, the primary processor is responsible, in part, for tracking this hierarchy, thereby aiding the dependent processor in the calculations.

As set forth in FIG. 3, the primary processor 20 is first initialized to display the basic parameters at step 110. These parameters may be changed through entries at the keyboard. The CPU then signals the interface module to condition the latches and relays for receiving signals at step 112. In step 114, the primary processor 20 will enable dependent module 40 to begin the transient testing.

In step 116, the interface module acts to connect the signals to dependent processor 40 along the analog bus 64. The dependent processor 40 will then strip out the phase and amplitude information from the signal at step 118. Once the phase and amplitude information is obtained, it is compared with thresholds set by the primary processor during step 120. When a threshold hit is detected, its duration is evaluated by the dependent processor at step 122 to determine if the hit is "qualified". This evaluation is based upon the standards discussed above. Because the total evaluation of an event is complex and time dependent, it is desirable to divide this task between the dependent and primary processors. Accordingly, the partial evaluation derived by the dependent processor is then sent to the primary processor. The primary processor then continues the evaluation based on information from the dependent processor and performs a lockout analysis as set forth in step 124. This analysis is performed simultaneously with the dependent processors calculations on the next sample. This type of shared, pipeline processing allows the transient measurements to be performed in real time.

At frequent intervals, the results of the analyses are used to update the CRT display as shown in step 126. The primary processor also keeps track of the time intervals during which the transients are to be counted. If the total time period has not elapsed, the procedure will continue, as indicated at step 130. When the time period is finished, the dependent processor 40 is disabled at step 132.

Figure 4A:
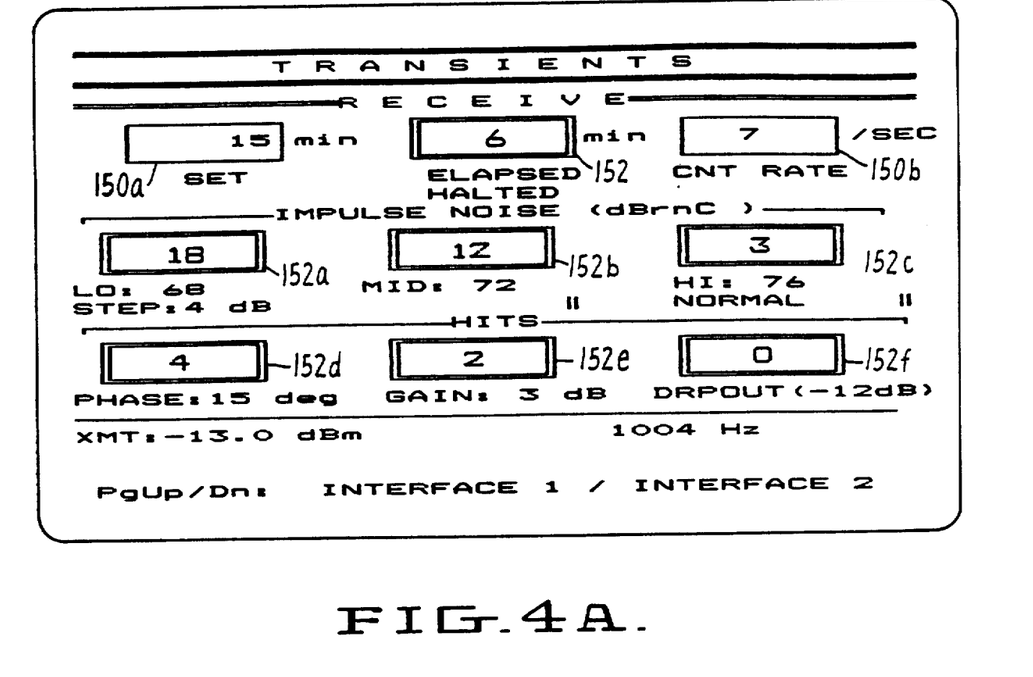
FIGS. 4A to 4C illustrate various screen formats which are utilized in the subject invention.

As pointed out above, during the transient measurements, the information displayed on the CRT is periodically updated. FIG. 4A represents one of the screen formats which is preferably utilized during transient measurements. As will be seen, there are a number of data boxes 150 in which parameters can be entered from the keyboard during the initiation of the test. Each of these boxes has a single border. Values can be entered in one of two ways. If an absolute number is to be entered, it can simply be changed by the keyboard. In the alternative, where certain standard parameters used for the test, the CPU will have a number of preset values stored in memory which can be accessed using the up and down cursor keys on the keyboard. Movement from one box to the other within the screen display during the setup stage can also be carried out using the left/-right cursor keys. As seen in FIG. 4A, box 150a indicates the length of time the transient test is to be performed. Box 150b is used to set the count rate.

The screen will typically also include boxes 152 defined by double line borders. These boxes are indicative of result windows which will actively change during the measurement sequence. For example, boxes 152a-c are used to record impulse noise events at 68, 72, and 76 db respectively. Similarly, result boxes 152d-f are updated to display phase hits, gain hits and dropouts.

FIG. 4a illustrates one of the many screen displays which are generated by the primary processor 20. In accordance with subject invention, screen displays which are generated for other test measurements will have a consistent format. This format can be observed with reference to FIGS. 4b and 4c.

Figure 4B:
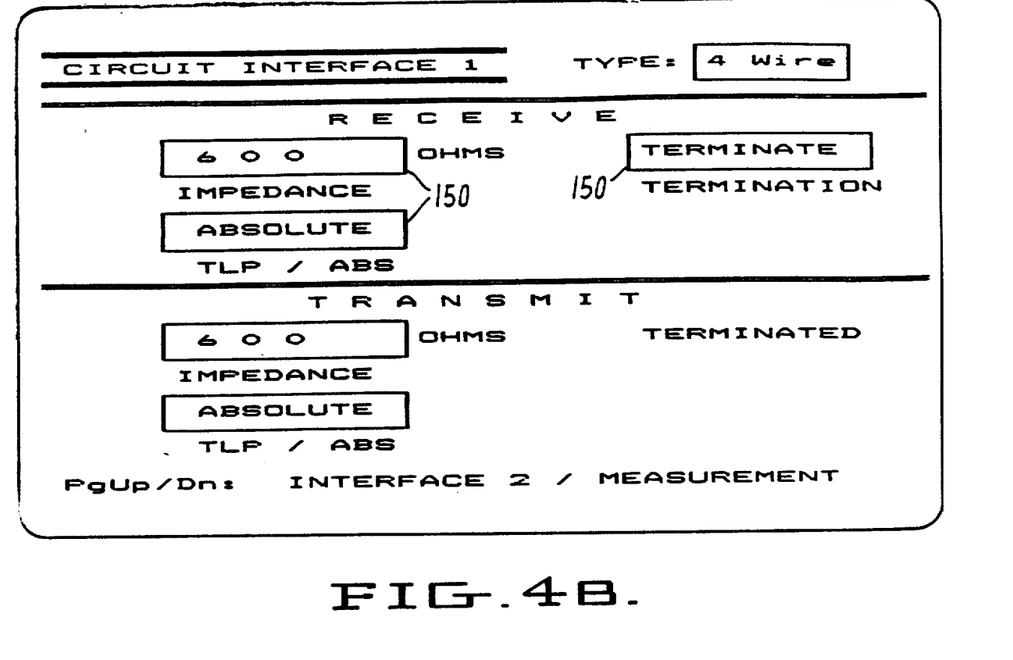

FIG. 4b represents a screen display which is generated during the initiation of a level and frequency measurement test described earlier with respect to FIG. 2b. A plurality of boxes 150 are shown into which test values can be inserted. For example, the operator can enter the line impedance on both the transmit and receive circuits. This information is then sent to the dependent processors associated with the test.

Figure 4C:
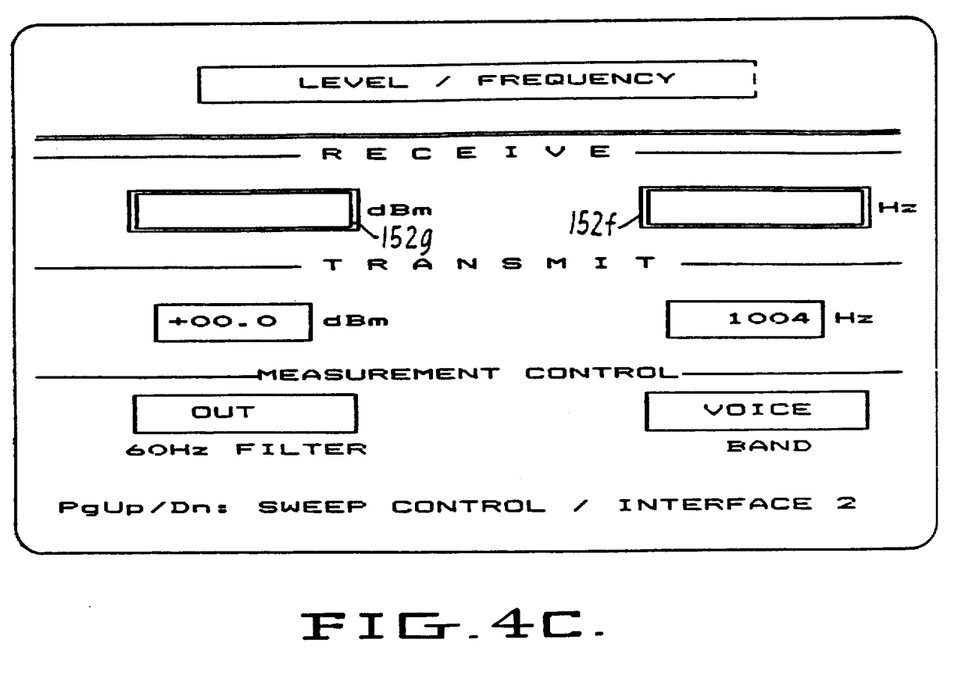

FIG. 4c represents the display that will be generated during the running of the level/frequency test. It will be seen that a signal is being transmitted at 1004 Hz. Double bordered result boxes 152g and f will be used to track the decibel level and frequency of measured signal.

A similar sequence can be described for the protocol PCM interface where an additional digital bus passes serial information for processing by the protocol module.

In summary, there has been provided a new and improved device which can perform multiple test functions. The test apparatus performs high-speed digital processing of both analog and digital input and output signals. A unique architecture is provided to allow information to flow on both analog and digital signal buses. A hierarchy of primary and dependent processors is described which allows overflow calculations from the dependent processor to be handled by the primary processor. Finally, the apparatus includes screen formats which are consistent despite a wide divergence of possible testing functions.

While the subject invention has been described with reference to a preferred embodiment, it should be understood that various other changes and modifications could be made therein by one skilled in the art without varying from the scope and spirit of the subject invention as defined by the appended claims.

We claim:

1. An apparatus for analyzing communication lines, comprising:
   a primary processor;
   a digital information bus;
   a dependent processor for digitally processing analog singals, said dependent processor being connected to said primary processor via said digital information bus;
   an analog information bus; and
   an interface module connected to said primary processor via said digital information bus and to said dependent processor via said analog information bus, said interface module having a means to connect said interface module to the communications lines to be analyzed so that the interface module may send analog signals to the communications lines and the interface module may receive analog signals from the communications lines, wherein the primary processor controls the signals passing between the interface module and the communications lines by sending digital instructions to both said dependent processor and said interface module via said digital information bus, and wherein said dependent processor and said interface module communicate using analog signals via said analog information bus.

2. An apparatus for analyzing communication lines comprising:
   a primary processor;
   a digital information bus;
   a first dependent processor connected to said primary processor via said digital information bus;
   a second dependent processor connected to said primary processor via said digital information bus; and
   an interface bus connecting said first and second dependent processors thereby allowing direct communication therebetween.

3. An apparatus for analyzing communication lines, comprising:
   a primary processor;
   a dependent processor for receiving analog signals from the communications lines to be analyzed, digitally processing the received analog signals, and sending other analog signals to the communciations lines; and
   a digital information bus connecting said dependent processor to said primary processor, wherein said primary processor provides instructions to said dependent processor over the digital information bus, for controlling the manner in which the dependent processor processes analog signals, wherein said dependent processor provides data to said primary processor over the digital information bus, and wherein the primary processor performs overflow calculations using the data received from the dependent processor to increase the speed of the functions performed by said dependent processor."

* * * * *